April 28, 1959  A. GILSI  2,883,746
GARDENING TOOL
Filed Nov. 7, 1955

INVENTOR:
ADOLF GILSI
BY *Wendeworth, Lind & Ponack*
ATTYS.

2,883,746

GARDENING TOOL

Adolf Gilsi, Binningen, Switzerland, assignor to Otto Suhner Aktiengesellschaft, Brugg, Switzerland Application November 7, 1955, Serial No. 545,503

Claims priority, application Switzerland November 9, 1954

4 Claims. (Cl. 30—205)

The present invention relates to a gardening tool and more particularly to a cutting device which serves for trimming of hedges and shrubs.

Cutting devices for such purposes are known, which have a rotating cutting member cooperating with a stationary comb. The cutting effect of such devices is based on the fact that the cuting edges of the cutting member engage the object to be cut in a scissor-like manner and sever the same under a predominantly pressing action.

A disadvantage inherent in such cutting devices is the resistance which is offered by branches of substantial thickness to the cutting action of the rotating member. Consequently the drive of the cutting device must have sufficient power to prevent repeated stalling.

Due to the above mentioned reason such cutting devices are very unpractical to handle and are moreover expensive. In addition the branches, especially those of the substantial thickness, will have a tendency to evade the cutting edge due to the pressing action of the latter such that they will not be severed. It is known, that a cut imparting pulling effect upon the object to be cut, will need much less power than a cut which is effected by pressing. Cutting devices having a rotating cutting member the cutting edges of which extend along its circumference are conventionally in use for cutting sausage goods and the like. However such a cutting device necessitates the provision of a special mechanism to feed the object to be cut towards the cutting edge since the latter does not execute any transverse movement.

The cutting device according to the present invention having a rotating cutting member cooperating with the stationary comb is characterized by cutting edges extending over at least a portion of the circumference of the cutting member at an acute angle with respect to the tangent of the rotating movement but deviating from zero in order to effect a cut having a predominantly pulling component and periodically travelling over an area of substantial radial extension and characterized by the fact that at least the straight edges of the comb teeth are traversed along their entire length from the end nearest the shaft of the cutting edge to the other end thereof by the curved cutting edges, the straight edges being outwardly inclined from a radial position to a position in which they are inclined in the opposite direction from the direction of rotation of the cutting member, while the ends of the comb teeth situated outside said area extend in the direction of feed of the device.

In order that the invention may be better understood and put into practice several embodiments thereof are hereinafter described by way of example and with reference to the accompanying drawings; in which.

Figure 1:
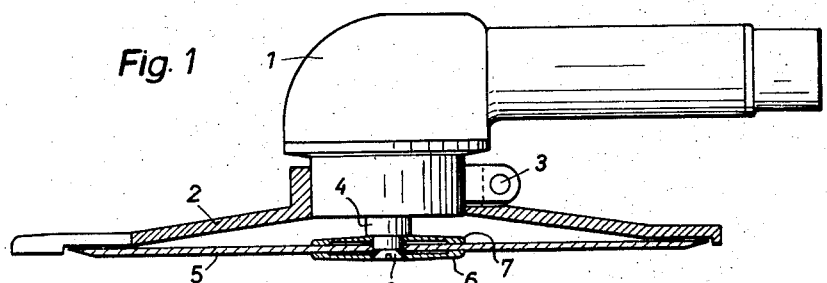
Fig. 1 shows a longitudinal section through the device according to the invention.
Figure 2:
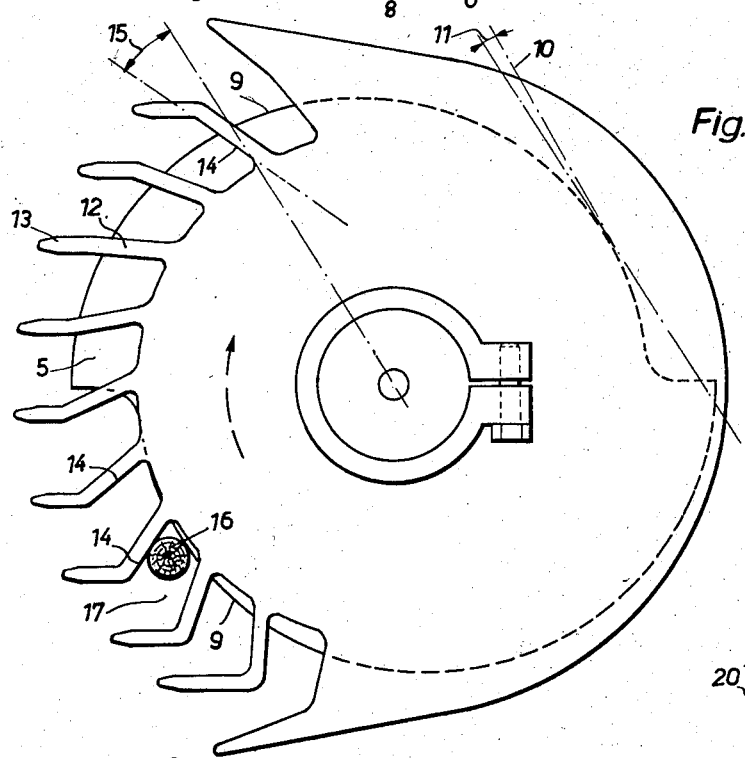
Fig. 2 is a plan view of the comb and the cutting member.

Construction and method of operation of the cutting device shown are as follows:

In Fig. 1 a handle 1, constituted by an angled hand piece and adapted to receive a flexible shaft for the drive of the cutting member has connected to it a comb 2 by means of a screw 3.

On the operating shaft 4 of the handle 1 a cutting member 5 is arranged between two flanges 6 and 7 which are connected with each other by means of a screw 8.

The tangent of the cutting edges 9 of the cutting member 5 includes an acute angle 11 with respect to the tangent 10 of the rotational movement.

In order to maintain this angle at all points along the cutting edge 9 at a constant value the design of the cutting edge would have to be based on a logarithmical spiral. The experience shows however that satisfactory results may also be obtained by a cutting edge constituting a circular arc or another similar curve section. The cutting member might also be of elliptical configuration. However those portions of the circumference having a negative angle 11 would have no cutting action. It is therefore suitable to design the cutting member such that its circumference is recessed very steeply by example along the radius from the outermost point of one cutting edge to the innermost point of the following cutting edge. Especially good results have been obtained with a construction of the cutting member wherein the cutting edges are constituted by two circular arcs displaced with respect to each other and with respect to the center of rotation.

The comb 2, which for reasons of safety covers the whole cutting member, is provided with teeth 12 having protruding portions 13 which, situated outside of the cutting zone, extend substantially in the direction of feed of the cutting device. Within the cutting zone the teeth have straight edge portions inclined outwardly at an acute angle 15 with respect to the radial direction, i.e. the straight edges 14 are inclined outwardly in the opposite direction from the direction of movement as indicated by an arrow. It will be understood that a branch 16 to be severed will easily enter into one of the work retaining pockets 17 due to the fact that the ends 13 of the teeth 12 extend in the direction of feed and that upon making contact with the cutting edge 9 this branch will be pressed against the edge 14 to be subsequently severed by a pulling cut.

Figure 3:
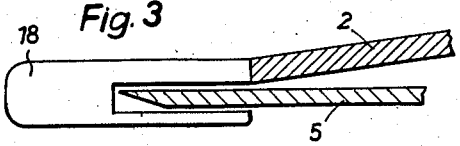
Fig. 3 shows a modification of a comb tooth engaging over the edge of the cutting member.
Figure 4:
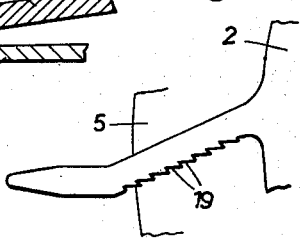
Fig. 4 is a modification of the comb tooth having a toothed edge.

In order to cut material such as grass which will easily bend the comb 2 is provided with teeth 18 engaging over the edges of the cutting member within the cutting zone as shown in Fig. 3. The tendency of the material to be cut to evade the cutting edge cannot only be countered by the backward inclination 15 of the tooth edges 14 but also by providing these edges with small tooth-like protrusions 19.

Figure 5:
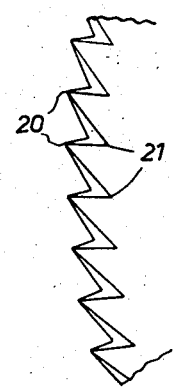
Fig. 5 shows a modification of a cutting member having a toothed cutting edge.

According to Fig. 5 a cutting member may be provided, in which the knife-like cutting edge is substituted by cutting teeth 20. It has been found that the cutting or sawing action is especially satisfactory if the recesses between the teeth are provided at least on one side of the cutting member with grooves 21 extending inwardly such as to permit an undisturbed flow of the chips being cut off.

It will be understood that various other modifications may be made without departing from the spirit or scope of the invention.

I claim:

1. A cutting device for hedges and shrubs comprising a holding member, a rotatable shaft supported in said holding member with one end protruding therefrom, a disc-shaped cutting member mounted on the protruding end of said shaft and having curved cutting edges along the periphery thereof, a tangent to said cutting edges forming an acute positive angle with a tangent to a circle with said shaft as a center, a curved comb adjacent said cutting member having a plurality of teeth in a plane parallel to the plane of said cutting member, said teeth each comprising a straight edge portion and an outwardly protruding portion, said edge portion being adjacent said cutting edges, said curved cutting edges traversing the length of said edge portion from the end nearest the shaft to the end from which said outwardly protruding portions projects, the entire length of said edge portion traversed by said curved cutting edges being outwardly inclined from a radial position to a portion in which it is inclined in the opposite direction from the direction of rotation of said cutting member to form a work retaining pocket and said protruding portions extending from the ends of said edge portions in the direction of feed of said cutting device.

2. A cutting device as claimed in claim 1 in which each cutting edge is a circular arc about a center eccentric to said shaft.

3. In a cutting device for hedges and shrubs having a holding member, a comb on said holding member and a rotatable shaft supported in said holding member with one end protruding therefrom, that improvement comprising a disc-shaped cutting member mounted on the protruding end of said shaft and having curved cutting edges along the periphery thereof, a tangent to said cutting edges forming an acute positive angle with a tangent to a circle with said shaft as a center, said comb being curved adjacent said cutting member and having a plurality of teeth in a plane parallel to the plane of said cutting member, said teeth each comprising a straight edge portion and an outwardly protruding portion, said edge portion being adjacent said cutting edges, said curved cutting edges traversing the length of said edge portion from the end nearest the shaft to the end from which said outwardly protruding portion projects, the entire length of said edge portion traversed by said curved cutting edges being outwardly inclined from a radial position to a position in which it is inclined in the opposite direction from the direction of rotation of said cutting member to form a work retaining pocket and said protruding portions extending from the end of said edge portions in the direction of feed of said cutting device.

4. The improvement as claimed in claim 3 in which each cutting edge is a circular arc about a center eccentric to said shaft.

References Cited in the file of this patent
UNITED STATES PATENTS

| | | |
|---|---|---|
| 844,414 | Seabloom | Feb. 19, 1907 |
| 1,551,647 | Dyson | Sept. 1, 1925 |
| 1,846,020 | Bangser | Feb. 23, 1932 |
| 1,974,602 | Dziedzic | Sept. 25, 1934 |
| 2,427,265 | Dreischerf | Sept. 9, 1947 |

FOREIGN PATENTS

| | | |
|---|---|---|
| 10.179 | Australia | 1927 |
| 726,824 | France | Mar. 14, 1932 |